(12) United States Patent
Ju et al.

(10) Patent No.: US 7,528,222 B1
(45) Date of Patent: May 5, 2009

(54) OLEFIN POLYMERIZATION PROCESS

(75) Inventors: Shiaw T. Ju, Bellaire, TX (US); Stephen L. Robertson, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 12/014,467

(22) Filed: Jan. 15, 2008

(51) Int. Cl.
*C08F 6/24* (2006.01)
*C08F 10/06* (2006.01)

(52) U.S. Cl. ................. 528/492; 528/484; 528/501

(58) Field of Classification Search ........... 528/492, 528/501, 484; 526/74
See application file for complete search history.

(56) References Cited

U.S. PATENT DOCUMENTS

| | | | |
|---|---|---|---|
| 3,600,371 A * | 8/1971 | Marwil | 528/498 |
| 4,686,279 A * | 8/1987 | Nagtzaam et al. | 528/501 |
| 4,803,259 A * | 2/1989 | Zboril et al. | 528/483 |
| 5,420,239 A | 5/1995 | Sun et al. | |
| 5,712,365 A * | 1/1998 | Arai et al. | 528/498 |
| 6,111,034 A | 8/2000 | Goode et al. | |
| 6,335,402 B1 | 1/2002 | Mihan et al. | |

FOREIGN PATENT DOCUMENTS

| | | |
|---|---|---|
| EP | 0 927 724 | 7/1999 |
| EP | 0 811 638 | 12/2007 |
| WO | 93/25590 | 12/1993 |
| WO | 95/07941 | 3/1995 |
| WO | 03/042253 | 5/2003 |
| WO | 2004/026923 | 4/2004 |

OTHER PUBLICATIONS

U.S. Appl. No. 11/724,890, filed Mar. 16, 2007, Inventor: Lawrence C. Smith, entitled Method and Apparatus For Separation Of Polymer From A Slurry.

* cited by examiner

*Primary Examiner*—Fred M Teskin
(74) *Attorney, Agent, or Firm*—Kevin M. Faulkner

(57) ABSTRACT

Disclosed is a method for reducing fouling in an apparatus and process for separating polyolefin from a slurry in a slurry polymerization reactor system comprising contacting in a reactor at a pressure of at least 2000 kPa a catalyst composition and α-olefin monomers to form a polyolefin reaction mixture; transferring the polyolefin reaction mixture to a high pressure separator, wherein the pressure in the high pressure separator is within the range of from 200 to 2500 kPa; and contacting the polyolefin reaction mixture with an organic amine prior to its entering the high pressure separator.

26 Claims, 2 Drawing Sheets

OLEFIN POLYMERIZATION PROCESS

FIELD OF THE INVENTION

The present invention(s) is related to an olefin polymerization process, and in particular, the reduction of polymer fouling and/or plugging tendencies in the separation of the desired polyolefin product and unreacted monomers from a polyolefin reaction mixture.

BACKGROUND

In a slurry polymerization process, it is common to separate polymer from diluent in a pressure vessel by flashing off the diluent overhead and recovering the polymer via gravity. Most of the separation vessels operate fairly well when there is a sufficient pressure differential available across such vessels. See U.S. Ser. No. 11/724,890, filed Mar. 16, 2007 "Method and Apparatus for Separation of a Polymer Slurry." However, when the available pressure differential is reduced such as in the case of using multi-stage separation to reduce energy consumption, polymer can potentially accumulate in the vessel and eventually plug and foul equipment, causing operability problems that interrupt the operation of the reactor.

The polymer that accumulates can be so called "amorphous" polymer, or simply polymer that has formed agglomerates such that large chunks of the polymer can no longer cycle through the reactor system and plugs one or more operating lines or openings. Also, polymer may adhere to the inside surface of the reactor system and accumulate to such a degree that the system is fouled. It is known in the art that such fouling can be inhibited within the reactor using certain catalyst inhibitors or "killers". For instance, it is disclosed in WO95/07941 that various low molecular weight compounds such as amines, ethers, carbon dioxide, and others can be used to deactivate catalyst at the downstream side of the reactor or before a separation and compression stage in a high pressure polymerization process. See also WO93/25590 and WO04/026923. It is particularly well known to use catalyst killers such as amines and other compounds in gas phase reactor systems, such as disclosed in U.S. Pat. No. 6,111,034, U.S. Pat. No. 6,335,402, EP 0 811 638 A2, EP 0 927 724 A1, and WO03/042253. A method for the inhibition of the formation of polymer agglomerates or "popcorn" is found in U.S. Pat. No. 5,420,239.

What is needed is an improved method of inhibiting polymer agglomeration and fouling within the separation section downstream of a polymerization reactor that improves the overall service factor of a production train. There is a particular need for such a method in slurry-type polyolefin reactors which operate at relatively low pressures compared to high pressure processes and the polymer in suspension can easily agglomerate as unreacted monomers are removed.

SUMMARY

In one aspect is a polymerization process comprising contacting in a reactor at a pressure of at least 2000 kPa a catalyst composition and α-olefin monomers to form a polyolefin reaction mixture; transferring the polyolefin reaction mixture to a high pressure separator, wherein the pressure in the high pressure separator is within the range of from 200 to 2500 kPa; and contacting the polyolefin reaction mixture with an organic amine prior to its entering the high pressure separator.

In certain embodiments the α-olefin monomer is selected from ethylene and $C_3$ to $C_{10}$ α-olefins, and in another embodiment the α-olefin monomer is propylene and optionally ethylene, 1-butene or 1-hexene. Desirably, propylene homopolymer or propylene copolymers are produced in the process.

In certain embodiments, the separation of solids from the unreacted monomer and diluent is facilitated by a pressure differential; the pressure within the reactor is at least 5% greater than the pressure in the high pressure separator.

Insofar as certain numerical ranges of the features of the invention(s) are described, it is understood that any desirable upper limit of that range can be combined with any desirable lower limit of that range, as disclosed herein, to achieve a preferred range.

DETAILED DESCRIPTION

Figure 1:
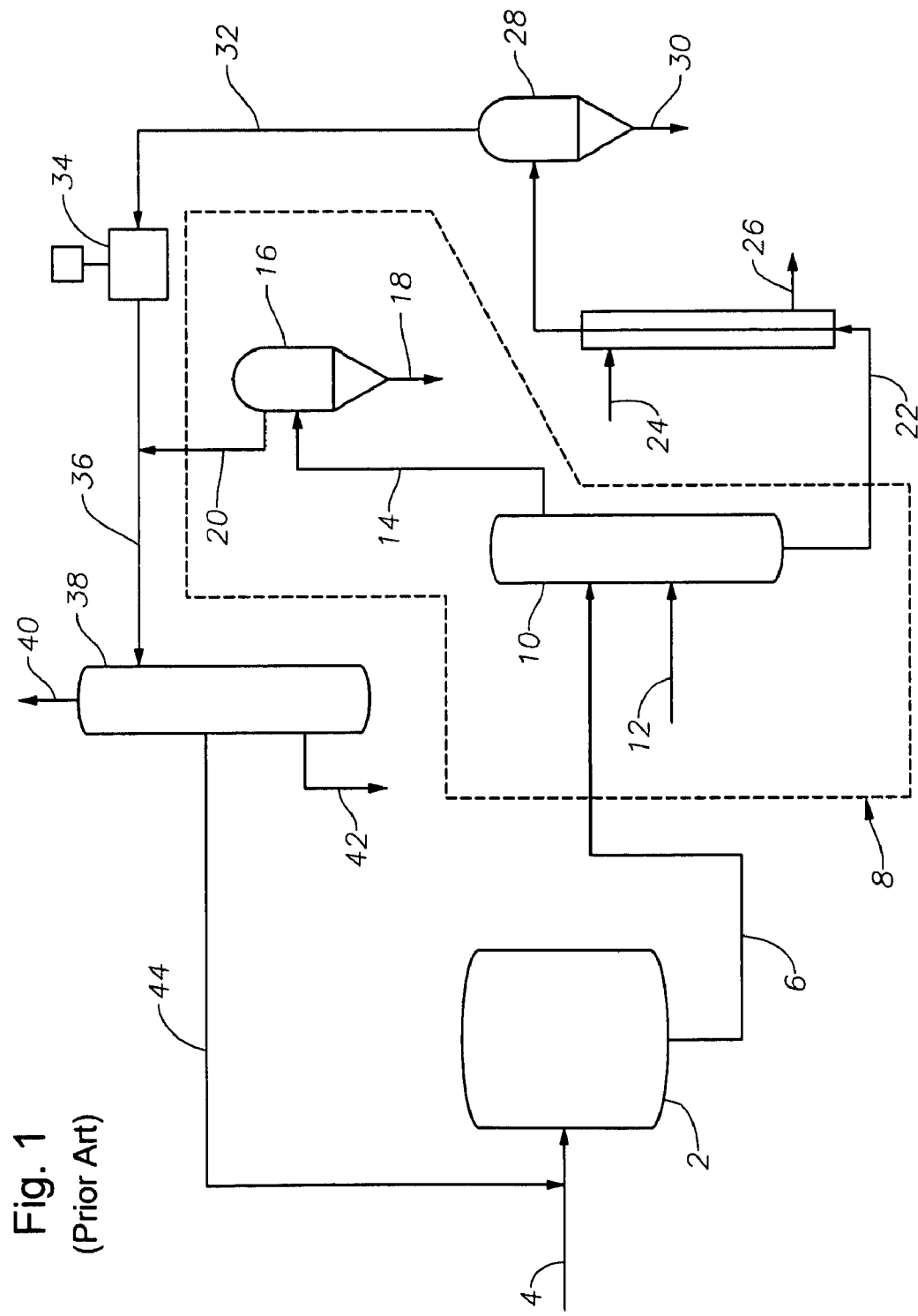
FIG. 1 is a schematic representation of a prior art slurry polymerization system including an Amorphous Removal System for removing amorphous polymer from the system.

As used herein, an "organic amine" is a compound having at least one paraffinic or olefinic group bound to a nitrogen atom, forming an amine or an amide compound. In one embodiment, the paraffinic or olefinic group includes (as a side chain or within the backbone) a polar or ionic moiety. Such polar or ionic moeties can include hydroxyl groups, carboxylate groups, ether groups, ester groups, sulfonate groups, sulfite groups, nitrate groups, nitrite groups, phosphate groups, phosphite groups and combinations thereof. In one embodiment, the paraffinic or olefinic groups are selected from the group consisting of $C_1$ to $C_{40}$ alkyls and substituted alkyls; and are $C_{10}$ to $C_{40}$ alkyls or substituted alkyls in a particular embodiment. A "substituted alkyl" includes alkyls possessing moieties as described above.

In one embodiment, the organic amine is an ether amine having the following formula: $(R'OH)_{3-x}NR_x$, wherein R is selected from the group consisting of hydrogen atoms, $C_1$ to $C_{40}$ alkyl radicals, $C_2$ to $C_{40}$ alkylethers, $C_1$ to $C_{40}$ alkylcarboxylic acids, and $C_2$ to $C_{40}$ alkylesters; and R' is selected from $C_1$ to $C_{40}$ alkyl radicals, $C_2$ to $C_{40}$ alkylethers, $C_1$ to $C_{40}$ carboxylic acids, and $C_2$ to $C_{40}$ alkylesters; and wherein x is 0, 1, 2 or 3; preferably x is 0 or 1, and is 1 in a particular embodiment. In yet another embodiment, the R group is selected from the group consisting of hydrogen atoms and $C_5$ to $C_{40}$ alkyl radicals; and the R' is selected from $C_5$ to $C_{40}$ alkyl radicals and $C_5$ to $C_{40}$ alkylethers.

Non-limiting examples of useful organic amines include bis(2-hydroxyethyl) isodecyloxypropylamine, poly(5)oxyethylene isodecyloxypropylamine, bis(2-hydroxyethyl) isotridecyloxypropylamine, poly(5)oxyethylene isotridecyloxypropylamine, bis(2-hydroxyethyl) linear alkyloxypropylamine, bis(2-hydroxyethyl) soya amine, poly(15)oxyethylene soya amine, bis(2-hydroxyethyl) octadecylamine, poly(5)oxyethylene octadecylamine, poly(8)oxyethylene octadecylamine, poly(10)oxyethylene octadecylamine, poly(15)oxyethylene octadecylamine, bis(2-hydroxyethyl) octadecyloxypropylamine, bis(2-hydroxyethyl) tallow amine, poly(5)oxyethylene tallow amine, poly(15)oxyethylene tallow amine, poly(3)oxyethylene-1,3-diaminopropane, bis(2-hydroxyethyl) cocoamine, bis(2-hydroxyethyl) isodecyloxypropylamine, poly(5)oxyethylene isodecyloxypropylamine, bis(2-hydroxyethyl) isotridecyloxypropylamine, poly(5)oxyethylene isotridecyloxypropylamine, bis(2-hydroxyethyl) linear alkyloxypropylamine, bis(2-hydroxyethyl) soya amine, poly(15)oxyethylene soya amine, bis(2-hydroxyethyl) octadecylamine, poly(5)oxyethylene octadecylamine, poly(8)oxyethylene octadecylamine, poly(10)oxyethylene octadecylamine, poly(15)oxyethylene octadecylamine, bis(2-hydroxyethyl) octadecyloxypropylamine, bis(2-hydroxyethyl) tallow amine, poly(5)oxyethylene tallow amine, poly(15)oxyethylene tallow amine, poly(3)oxyethylene-1,3-diaminopropane, bis(2-hydroxethyl) cocoamine, valeramide, caproicamide, erucamide, caprylicamide, pelargonicamide, capricamide, lauricamide, myristicamide, palmiticamide, margaric (daturic) amide, stearicamide, arachidicamide, behenicamide, lignocericamide, ceroticamide, carbocericamide, montanicamide, melissicamide, lacceroicamide, ceromelissic (psyllic) amide, geddicamide and ceroplastic amide. A general discussion of useful amines, quaternary amine and other antistatic compounds can be found by R. F. Grossman in 15(3) J. VINYL TECH. 164 (2004). Commercial examples of useful organic amines are the Atmer™ ethoxylated amines.

One aspect of the process described herein is directed to a process to produce polyolefins by reacting α-olefin monomers with a catalyst to produce a polyolefin. The polymerization reaction preferably takes place mostly in one or more reactor(s). In one embodiment, propylene monomers are combined with a catalyst in a diluent to produce polypropylene homopolymer, or propylene and catalyst is also combined with comonomer to produce propylene copolymer, impact copolymer, block copolymer, or other types of copolymers. Desirable comonomers include ethylene, 1-butane, 1-hexane, 1-heptene, 1-octene, and cyclohexene. The term "polypropylene" refers to homopolymers of propylene, and copolymers or terpolymers of propylene wherein the amount of propylene-derived units is greater than 50 wt % based on the weight of the polymer.

The temperature of the polyolefin reaction mixture within the reactor(s) does not constitute a limiting parameter in the process of this invention. In the process of this invention the temperature of the medium in the reactor ranges from 50° C. to below the melting temperature of said polyolefin product, and from 50° C. to 160° C. in another embodiment, and from 60° C. to 120° C. in another embodiment. The polymerization is completed at a pressure of at least 2 MPa (2000 kPa) in one embodiment, and a pressure of from 2.2 to 30 MPa in another embodiment, and at a pressure in the range from 2.3 to 10 MPa in yet another embodiment. Preferably, the polymerization takes place at a pressure within the range from 2.2 to 5 MPa, wherein any lower pressure limit can be combined with any upper pressure limit to provide a desirable pressure range.

In its most preferred embodiments, the process of this invention is carried out as a continuous process wherein the polymerization medium containing polymer product and catalyst is removed from the reactor containing fresh catalyst and monomer and fresh diluent (when a diluent is used), all of which are added to the reaction zone in corresponding amounts to maintain an equilibrium of mass within the reaction zone. In the continuous process unreacted monomer and/or diluent are recovered from the polymer product by, for example, flash evaporation, conditioned for reuse and recycled to the reaction zone as at least a part of the makeup amounts of monomer and/or diluent feed to the reaction zone. To save cost of recompression of recovered monomer, it is preferably flashed away from the product polymer by only a slight reduction of pressure, or, alternatively with no reduction of pressure by the addition of moderate amounts of additional heat to the medium during the flash recovery operation. Wherein a polymerization diluent is used as the medium, the bulk of unreacted monomer is preferably recovered separately from the diluent by a first high pressure flashing operation and the diluent, together with small amounts of unreacted monomer, is next recovered by total pressure reduction on the polyolefin reaction mixture.

Inert hydrocarbon compounds which may be used as a polymerization diluent to provide the polymerization medium include aliphatic, cycloaliphatic, and aromatic hydrocarbons having from six to twenty carbon atoms. Suitable diluents include hexane, cyclohexane, heptane, methylcyclohexane, octane, toluene, xylene. The temperature chosen for the most optimum practice of the process is in part governed by the type of polymerization medium used and the type of comonomer used. Wherein comonomers of a diluent are used which are themselves of relatively high volatility then lower reaction temperatures may be used while still obtaining satisfactory post reaction flashing of the unreacted comonomer and/or diluent medium away from the product polymer compared to the case wherein a diluent or comonomer of low volatility is used.

Unreacted monomer may be recovered without significant pressure reduction, slightly recompressed and then recycled to the reactor for reuse. The diluent may be separately recovered by full pressure reduction after unreacted monomer is recovered. In one embodiment, the process is practiced with a polymerization medium which consists essentially of one or more monomers maintained by pressure in a fluid state. Thus, with the same reactor, a greater level of throughput of polymer production can be realized than when an inert diluent is used as the polymerization medium.

When using liquid monomer as reaction diluent, the quantity of monomer which remains unreacted following polymerization may be separated from polyolefin by flashing without significant pressure reduction. The unreacted monomer is recovered, slightly recompressed as necessary and recycled back to the reactor for further use. Most desirably, unreacted monomer is flashed off of the polyolefin product without significant reduction of its pressure by first routing the polyolefin reaction mixture to a high pressure separator. Accordingly, it may be preferred to run the polymerization reaction at as high a temperature as possible, i.e., no greater than the polymer melting temperature, to enable the bulk of the medium, consisting of unreacted monomer, to be flashed away from the polymer with only a slight reduction of pressure. This permits the unreacted monomer to be recovered for recycle back to the reactor after only slight recompression, a significant cost savings in the economics of the process which may be accomplished with a small amount of additional heat input to the medium after its removal from the reaction zone.

In particular, the invention(s) herein is directed to a polymerization process that includes a method for the separation of polymer obtained from a polymerization process, a "slurry" process in a particular embodiment, wherein the polyolefin reaction mixture comprises insoluble polymer and unreacted carrier fluid ("polyolefin reaction mixture"). Preferably, a polyolefin reaction mixture polymerization process is used to polymerize an olefin, such as propylene or ethylene. As will be known to persons skilled in the art, in a slurry polymerization process, the forming polymers are contained within a carrier fluid which may comprise unreacted monomer, such as $C_1$ to $C_{20}$ alkenes, preferably propylene monomer and/or ethylene monomer, and/or inert diluents, such as $C_5$ to $C_{20}$ hydrocarbons, preferably pentanes or hexane. The method and apparatus disclosed herein may utilize a second heating means to increase the temperature of the enriched polyolefin reaction mixture (meaning a polyolefin reaction mixture having a higher concentration of polymer than it had upon exiting the reactor(s)) obtained from the first separation means prior to secondary separation processing, and thereby increasing the amount of unreacted carrier fluid recovered during the secondary separation.

FIG. 1 is a schematic illustration of one embodiment of a polymerization apparatus, in this embodiment, a slurry polymerization apparatus. Olefin monomers, cocatalyst (when present) and catalyst 4 are injected into reactor 2 by any means as is known in the art. Each component may be separately injected into the reactor, or combined in any fashion. A diluent may be injected as well, and/or may already be present in the reactor 2. Suitable diluents include $C_5$ to $C_{20}$ or $C_{12}$ hydrocarbons, examples of which include pentane, hexane, heptane, and mixtures thereof. Upon combining the appropriate components, polyolefin is formed in reactor 2. In the case of slurry-type polymerization, the polymer is insoluble in the diluent and thus forms a suspension or polyolefin reaction mixture. As is known in the art, there may be more than one reactor, for instance, there may be two or three reactors in series such as the polyolefin reaction mixture and other components pass through each in series. In any case, upon entering the reactor 2, and leaving reactor 2, the polyolefin reaction mixture comprises polymer and unreacted carrier fluids (catalyst, cocatalyst, unreacted monomers, diluents, etc.).

The polyolefin reaction mixture comprising polymer and unreacted carrier fluid is passed from the reactor 2 through a transfer means 6 into what is generally called the "Amorphous Removal System" 8. The purpose of the Amorphous Removal System is to separate undesirable polymer products from the polyolefin reaction mixture, as it is not only undesirable commercially, but may agglomerate inside the transfer lines and other components of the reactor and cause fouling and/or plugging of the system, necessitating a shutdown of the reactor to clean out the agglomerate that is attached to the inside walls of the system or otherwise formed large enough to plug the reactor at one or more locations. The level instrument on the extractor, separator, or other separator means is a good indicator of polymer build-up inside. For a given polymer throughput and a level set point, if the opening of the letdown valve on a separation vessel increases with time during the run then there is a buildup inside. Post run inspections can later confirm plugs in this process vessel.

In one embodiment, the Amorphous Removal System comprises an extractor 10, and a series of drums 16 connected to extractor 10 via a transfer means 14. The extractor is used to separate undesirable amorphous polymer from the desired product stream, and operates like a distillation column with internal stages. The extractor in one embodiment uses a counter-current monomer flow (e.g., propylene) to wash and extract the amorphous polymer out of the propylene reaction mixture. As used herein, the "transfer means" can be any means and/or structure for transferring polyolefin reaction mixture and or liquids from one point in the reactor system to another, such as a conduit, pipe, tubing, etc. In any case, the polyolefin reaction mixture in transfer means 6 enters the extractor 10 where propylene and a deactivator 12, preferably water and/or alcohol, is injected as well. The extractor is used to separate undesirable amorphous polymer from the polyolefin reaction mixture. In one embodiment, it is similar to a distillation tower, wherein heavy components, in particular, the final polymer, pass through a transfer means 22 at the bottom of the extractor 10, and light components pass to drum 16 through transfer means 14.

From drum 16, unreacted monomers such as propylene and ethylene, and diluent, pass to the fractionator via transfer means 20 and 36. Generally, drum 16 represents a series of vessels in the amorphous removal system that provides surge capacity and separation stages for the system to operate properly. The fractionator is used to separate monomers, such as propylene, from the diluent for monomer recycle through transfer means 44 back to the reactor 2. Unreacted material (e.g., such as hydrogen) is vented through 40, and unreacted heavy components (e.g., such as alcohol) is removed through purge 42. Atactic polymer, such as atactic polypropylene, and ash is separated from the unreacted polyolefin reaction mixture components through 18, where it can be discarded.

The heavy components pass via transfer means 22 to a dust collector 28, where polymer granules 30 are removed from the system. Before passing to the dust collector 28, the polymer may be further heated in transfer means 22 via passing steam from 24 to 26 jacketing means. Other means, such as hot water, electric heat tracing, microwaves and other radiant heat sources, or other types of heaters, can also be used. The heating of the heavy components serves to facilitate further enrichment of the polyolefin reaction mixture. The vaporized gases can thus pass out of the dust collector via transfer means 32 and through a compressor 34 where it is then passed on to the fractionator 38, wherein desirable components such as unreacted monomer is isolated, and ultimately recycled back to the reactor 2.

Figure 2:
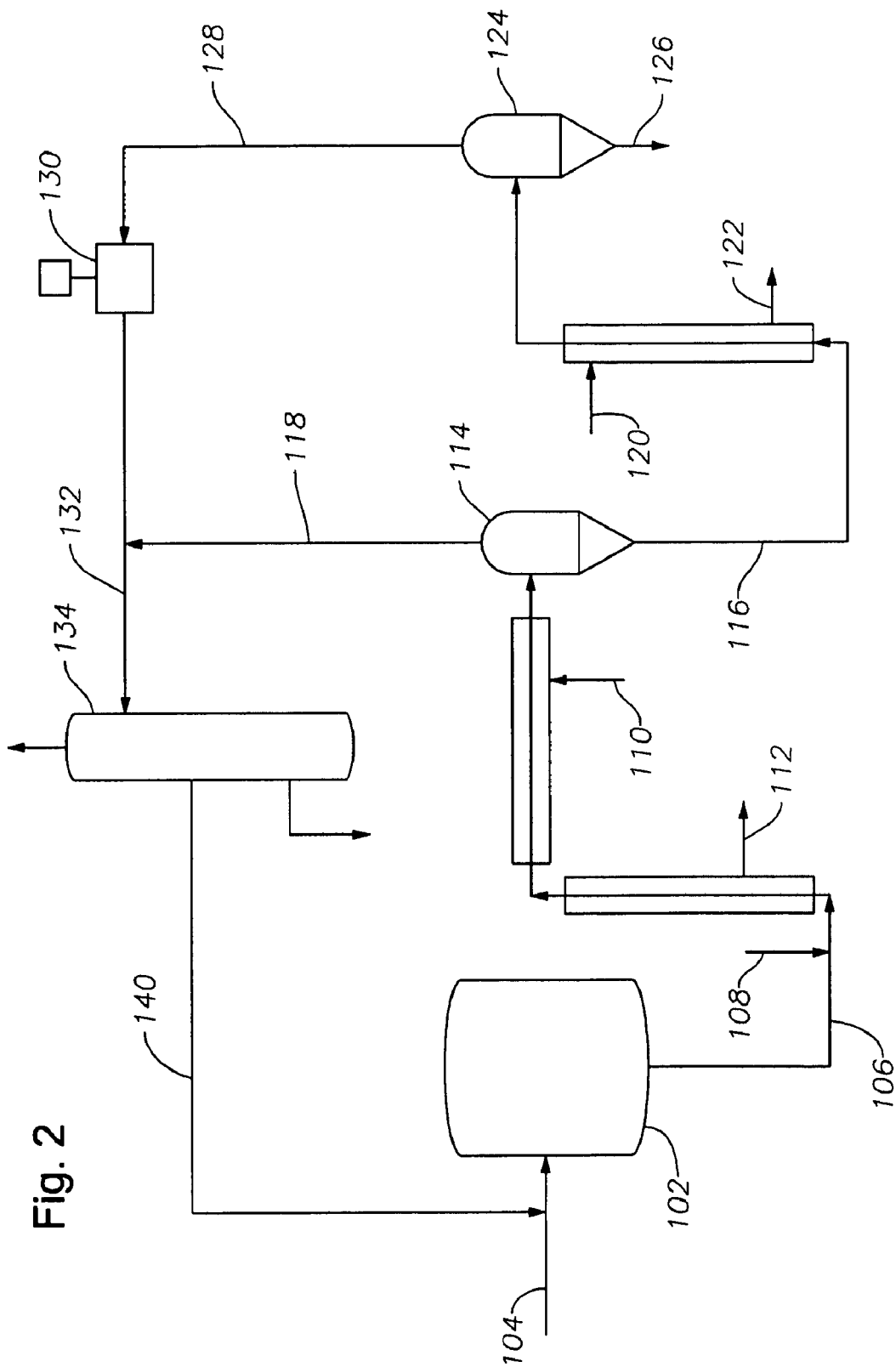
FIG. 2 is a schematic representation of one embodiment of the inventive polyolefin polymerization system including a high pressure separator for separating polymer and unreacted monomer and/or diluent.

FIG. 2 is a schematic illustration of one embodiment of a polymerization apparatus, in this embodiment, suitable for the inventive process. Monomers, cocatalyst and catalyst 104 are injected into reactor 102 (which can be two or more reactors as described above) by any means as is known in the art. Each component may be separately injected into the reactor, or combined in any fashion. A diluent may be injected as well, and/or may already be present in the reactor 102. Suitable diluents preferably include $C_5$ to $C_{12}$ hydrocarbons, examples of which include pentane, hexane, heptane, and mixtures thereof. Upon combining the appropriate components, polymer is formed in reactor 102. In the case of slurry polymerization processes, the polymer is insoluble in the diluent and thus forms a polyolefin reaction mixture that is a suspension. Upon entering the reactor 102, and leaving reactor 102, the polyolefin reaction mixture comprises polymer and unreacted carrier fluids (catalyst, cocatalyst, unreacted monomers, diluents, etc.).

The polyolefin reaction mixture is then transferred via a first transfer means 106 to a high pressure separator 114. Before entering the high pressure separator, the polyolefin reaction mixture is combined with an amount of an organic amine. The amount may vary depending on the desired outcome. In one embodiment, an amount of organic amine is injected 108 into the first transfer means 106 that substantially eliminates agglomeration within the first transfer line and the high pressure separator. By "substantially eliminates", what is meant is that the attachment of polymer, amorphous or otherwise, to the inside surfaces of the transfer means and separator, if any, is such that it does not necessitate a shutdown of the reactor system. In one embodiment the concentration of the organic amine is maintained within the range from 10 to 2000 wppm (based on polymer throughput), and from 25 to 1000 wppm in another embodiment, and from 50 to 250 wppm in yet another embodiment. The organic amine may be added as a neat liquid or solid, or mixed with a diluent to the desired concentration. The organic amine may be added continuously or intermittently. In a preferred embodiment the organic amine is added continuously at some concentration level, wherein the concentration level may vary between the ranges above or remain constant within the ranges above. When added intermittently, the organic amine may be added in response to an event in the reactor system, such as when a buildup of polymer in the high pressure separator or a transfer means is detected. Alternately, the organic amine may be added intermittently, but at regular intervals. As stated above, the level instrument on the high pressure separator is a good indicator of polymer build-up inside the separator. For a given polymer throughput and a level set point, if the letdown valve opening increases with time during the run then there is a buildup in the high pressure separator.

Also, before entering the high pressure separator 114, the polyolefin reaction mixture is heated in one embodiment. In one embodiment, the polyolefin reaction mixture is heated by steam passing into 110 of a jacketing means and condensate passing out 112. Other means, such as hot water, electric heat tracing, microwaves and other radiant heat sources, or other types of heaters, can also be used. The polyolefin reaction mixture is heated to, and maintained at a temperature of from, greater than 50° C. in one embodiment, and from 50 to 120° C. in another embodiment, and from 60 to 100° C. in yet another embodiment, and from 65 to 95° C. in yet another embodiment.

In any case, the pressure within the high pressure separator 114 is maintained at a pressure within the range of from 200 to 2500 kPa in one embodiment, and from 500 to 2200 kPa in another embodiment, and from 800 to 2000 kPa in yet another embodiment. In one aspect, the pressure within the reactor is at least 5% greater than the pressure within the high pressure separator, and at least 10% greater in another embodiment, and at least 20% greater in another embodiment, and at least 30% greater in yet another embodiment. Further, the temperature within the high pressure separator 114 is within the range of 30 to 70° C. in one embodiment, and from 35 to 65° C. in another embodiment, and from 40 to 60° C. in yet another embodiment.

The separation of the polyolefin and the unreacted carrier fluid may be achieved by any means of liquid/solid separation such as by the use of a dust collector apparatus, a cyclone separator, a gravity separator, bag filters or combinations thereof, such that they can be placed under the desirable pressure. The vaporized portion of the unreacted carrier fluid separated from the polyolefin reaction mixture (e.g., such as propylene) exits the high pressure separator 114 via transfer means 118 for recovery and recycle to the reactor 102. The vaporized portion of the unreacted carrier fluid contains, for example, unreacted monomers and diluent. This is transferred to the fractionator 134, operating in a similar manner to fractionator 38, creating an enriched mixture that is sent to the reactor 102.

Subsequent to removing the diluent from the polyolefin reaction mixture and isolating the final polymer product, the enriched polyolefin reaction mixture is fed downstream to undergo final processing steps which may include heating the enriched polyolefin reaction mixture, removal of residual unreacted monomer and/or catalyst system deactivation. The removal of increased amounts of unreacted monomer by the apparatus described herein increases the downstream operating rate and overall capacity of the polymerization unit by reducing the amount of monomer in the further enriched polyolefin reaction mixture. The reduction in the amount of unreacted monomer in the further enriched polyolefin reaction mixture subsequently reduces both the volume of residual unreacted carrier fluid fed downstream and the burden on the downstream processing equipment to remove the residual unreacted monomer.

In one embodiment, the enriched polyolefin reaction mixture comprising the desired polyolefin passes from the high pressure separator 114 to a low pressure separator 124 (e.g., a dust collector) via transfer means 116. This transfer means 116 may also provide heating for the polyolefin and residual propylene therein via jacketing, steam passing into 120 and out of 122 to heat the contents of the transfer means. Preferably, this heating means comprises one or more jacketed pipes. The enriched polyolefin reaction mixture is heated to a temperature sufficient to vaporize at least a portion of the remaining unreacted carrier fluid of the enriched polyolefin reaction mixture. The final polyolefin 126 can be treated with water and/or wet nitrogen before drying and packaging. The vaporized portion of the enriched polyolefin reaction mixture, typically including unreacted monomer (e.g., propylene, ethylene, hexane, etc.), within dust collector 124 passes through transfer means 128 to a compressor 130, where the vaporized portion passes via transfer means 132 to the fractionator 134. Refined monomer can then be recycled 140 back to the reactor. The dust collector 124 preferably operates under low pressure conditions of about 150 kPa or less. Separation in this step may be achieved by use of a bag filter, though other methods commonly known in the art may also be employed.

The transfer of the enriched (in polymer) polyolefin reaction mixture from the high pressure separator 114 through the second heating means in transfer means 116 to the dust collector 124 is facilitated by the difference in pressure between the high pressure separator 114 and the dust collector 124, without providing any additional energy to the system. The number of pipes that may be incorporated into the transfer line 116 to provide heating is limited only by the available pressure to move the enriched polyolefin reaction mixture between the high pressure separator 114 and the dust collector 124, as well as the space available for installation of the jacketed pipes. In another embodiment, an additional motive device, not shown, may be provided at any location between the high pressure separator 114 and the dust collector 124 to move the enriched polyolefin reaction mixture.

Thus, in one aspect herein is described a polymerization process comprising contacting in a reactor or reactors at a pressure of at least 2000 kPa, and less than 30 MPa in one embodiment, a catalyst composition and α-olefin monomers to form a polyolefin reaction mixture; transferring the polyolefin reaction mixture to a high pressure separator, wherein the pressure in the high pressure separator is within the range of from 200 to 2500 kPa; and contacting the polyolefin reaction mixture with an organic amine prior to its entering the high pressure separator. The catalyst composition may include any combination of components as is known in the art as useful in catalyzing the polymerization of olefins. The catalyst composition may include any combination of a transition metal compound that is organometallic, a coordination complex, or combination thereof, a support such as magnesium, silica or alumina, and optionally a cocatalyst such as an alkylaluminum or alumoxane or organoborane.

In any case, the α-olefin monomer is selected from ethylene and $C_3$ to $C_{10}$ α-olefins in one embodiment of the inventive polymerization process. The α-olefin monomer is predominantly propylene with lower amounts of ethylene, 1-butene or 1-hexene as comonomer such that the final polyolefin comprises at least 50 wt % in propylene derived units. The polyolefin reaction mixture can then be separated into unreacted carrier fluids (e.g., unreacted monomers and diluent, if present) and polyolefin, wherein the polyolefin is isolated, and unreacted carrier fluid is recycled back to the reactor. In a particular embodiment, the polyolefin is insoluble with the unreacted carrier fluids and thus forms a slurry characteristic of "slurry" polymerization processes. In a preferred embodiment, the polyolefin that is formed is polypropylene.

Separation of the forming polyolefin and unreacted carrier fluid is facilitated by a pressure differential between the reactor and the separating means of the reactor system. In one embodiment the pressure within the reactor is at least 5 or 10 or 20 or 30 or 40% greater than the pressure in the high pressure separator. The transferring of polyolefin reaction mixture is carried out by means of a first transfer means. The organic amine is injected into the first transfer means at any desirable location upstream of the separator means. To further facilitate the enrichment of the polyolefin reaction mixture, the polyolefin reaction mixture is maintained at a temperature above 50° C., preferably in the first transfer means upstream of the separator means.

EXAMPLE

As comparative examples (numbered as runs 1-3), demonstrations were performed on a commercial scale reactor approximately 4 meters in diameter and 8 meters high. The demonstrations were run to produce propylene homopolymer using a first metallocene catalyst. Typical process conditions are listed in Table 1. During the first three demonstrations of a reactor designed as in FIG. 2, the unit did not operate for longer than 3 days. The first demonstration was stopped at 2 days, 6.6 hours, the second in less than 10 minutes, and the third demonstration after 2 days and 22.8 hours. Each time there was significant fouling and plugging (or polymer accumulation) in the high pressure separator upon inspection. In the failed tests (without Atmer™), there initially was a problem with the high pressure separator level control and eventually lost flow completely (i.e. no granules coming out of the separator) even when the letdown valve was wide open. Post run inspections later confirmed the high pressure separator was plugged.

As inventive tests (numbered as Runs 4-7), demonstrations were performed on a commercial scale reactor approximately 4 meters in diameter and 8 meters high. The demonstrations were run to produce propylene homopolymer using a second metallocene catalyst. Prior to the fourth demonstration, however, Atmer™ 163 (Ciba Specialties Chemicals) at 200 wppm (based on the polymer throughput) was initiated at the pipe leading to the high pressure separator and maintained at that level throughout the trial. The unit ran continuously for 6 days and 7.4 hours until a planned production shutdown. Subsequent inspection on the high pressure separator revealed no polymer accumulation and no clean-up was required.

About 65% of the Atmer injected stayed in the polymer while the rest went to recycle/vent streams. Neither product nor process issues related to Atmer injection were encountered.

The improved performance of high pressure separator 124 resulting from the addition of Atmer 163 was reproduced in three subsequent demonstrations (runs 5, 6 and 7) under the same conditions as Run 4.

TABLE 1

| Key Process Conditions | | |
|---|---|---|
| parameter | Runs 1-3 | Runs 4-7 |
| Reactor Temperature, ° C. | 64 | 68 |
| Target Reactor Pressure, MPa | 2.7 | 2.9 |
| Type of Reactor Diluent | propylene | propylene |
| High-pressure Separator Temp., ° C. | 50-55 | 50-55 |
| High-pressure Separator Press., MPa | 1.7-1.8 | 1.7-1.8 |
| Atmer ™ 163, wppm based on polymer | 0 | 200 |
| Fouling | Yes, reactor shut down in less than three days | No, reactor ran for over 6 days |

Having described the invention(s) in its various aspects, a first (1) embodiment is a polymerization process comprising:

(a) contacting in a reactor at a pressure of at least 2000 kPa a catalyst composition and α-olefin monomers to form a polyolefin reaction mixture;

(b) transferring the polyolefin reaction mixture to a high pressure separator, wherein the pressure in the high pressure separator is within the range of from 200 to 2500 kPa; and (c) contacting the polyolefin reaction mixture with an organic amine prior to its entering the high pressure separator.

2. The process of the first (1) embodiment, wherein the α-olefin monomer is selected from ethylene and $C_3$ to $C_{10}$ α-olefins.

3. The process of the numbered embodiments 1 and 2, wherein the α-olefin monomer is propylene and optionally ethylene, 1-butene or 1-hexene, and the polyolefin is polypropylene.

4. The process of any of the numbered embodiments, wherein the pressure within the reactor is at least 5% greater than the pressure in the high pressure separator.

5. The process of any of the numbered embodiments, wherein the transferring is by means of a first transfer means, and wherein the organic amine is injected into the first transfer means.

6. The process of any of the numbered embodiments, wherein the polyolefin reaction mixture is maintained at a temperature above 50° C.

7. The process of any of the numbered embodiments, wherein the pressure in the reactor is maintained within the range of from 2 to 30 MPa.

8. The process of any of the numbered embodiments, wherein the organic amine is an ether amine having the following formula: $(R'OH)_{3-x}NR_x$, wherein R is selected from the group consisting of hydrogen atoms, $C_1$ to $C_{40}$ alkyl radicals, $C_2$ to $C_{40}$ alkylethers, $C_1$ to $C_{40}$ alkylcarboxylic acids, and $C_2$ to $C_{40}$ alkylesters; and wherein R' is selected from $C_1$ to $C_{40}$ alkyl radicals, $C_2$ to $C_{40}$ alkylethers, $C_1$ to $C_{40}$ carboxylic acids, and $C_2$ to $C_{40}$ alkylesters; and wherein x is 0, 1, 2 or 3.

9. The process of numbered embodiment 8, wherein R is selected from the group consisting of hydrogen atoms and $C_5$ to $C_{40}$ alkyl radicals; and wherein R' is selected from $C_5$ to $C_{40}$ alkyl radicals and $C_5$ to $C_{40}$ alkylethers.

10. The process of any of the numbered embodiments, wherein the polyolefin reaction mixture is separated into unreacted carrier fluids and polyolefin, isolating the polyolefin, and recycling the unreacted carrier fluid to the reactor.

11. The process of numbered embodiment 10, wherein the polyolefin is insoluble with the unreacted carrier fluids.

What is claimed is:

1. A polymerization process comprising:
   (a) contacting in a reactor at a pressure of at least 2000 kPa a catalyst composition and α-olefin monomers to form a polyolefin reaction mixture comprising unreacted carrier fluids;
   (b) transferring the polyolefin reaction mixture to a high pressure separator, wherein the pressure in the high pressure separator is within the range of from 200 to 2500 kPa; and
   (c) contacting the polyolefin reaction mixture with an organic amine prior to its entering the high pressure separator;
   wherein the polyolefin is insoluble with the unreacted carrier fluids.

2. The process of claim 1, wherein the α-olefin monomer is selected from ethylene and $C_3$ to $C_{10}$ α-olefins.

3. The process of claim 1, wherein the α-olefin monomer is propylene and optionally ethylene, 1-butene or 1-hexene, and the polyolefin is polypropylene.

4. The process of claim 1, wherein the pressure within the reactor is at least 5% greater than the pressure in the high pressure separator.

5. The process of claim 1, wherein the transferring is by means of a first transfer means, and wherein the organic amine is injected into the first transfer means.

6. The process of claim 1, wherein the polyolefin reaction mixture is maintained at a temperature above 50° C.

7. The process of claim 1, wherein the pressure in the reactor is maintained within the range of from 2 to 30 MPa.

8. The process of claim 1, wherein the organic amine is an amine having the following formula: $(R'OH)_{3-x}NR_x$, wherein R is selected from the group consisting of hydrogen atoms, $C_1$ to $C_{40}$ alkyl radicals, $C_2$ to $C_{40}$ alkylethers, $C_1$ to $C_{40}$ alkylcarboxylic acids, and $C_2$ to $C_{40}$ alkylesters; and wherein R' is selected from $C_1$ to $C_{40}$ alkyl radicals, $C_2$ to $C_{40}$ alkylethers, $C_1$ to $C_{40}$ carboxylic acids, and $C_2$ to $C_{40}$ alkylesters; and wherein x is 0, 1, 2 or 3.

9. The process of claim 8, wherein R is selected from the group consisting of hydrogen atoms and $C_5$ to $C_{40}$ alkyl radicals; and wherein R' is selected from $C_5$ to $C_{40}$ alkyl radicals and $C_5$ to $C_{40}$ alkylethers.

10. The process of claim 1, wherein the polyolefin reaction mixture is separated into unreacted carrier fluids and polyolefin, isolating the polyolefin, and recycling the unreacted carrier fluids to the reactor.

11. The process of claim 10, wherein the polyolefin is polypropylene.

12. The process of claim 1, wherein an amount of organic amine is injected that substantially eliminates agglomeration within the high pressure separator.

13. The process of claim 1, wherein the organic amine is maintained at a concentration within the polyolefin reaction mixture within the range of from 10 to 2000 wppm.

14. A polymerization process comprising:
   (a) contacting in a reactor at a pressure of at least 2000 kPa a catalyst composition and α-olefin monomers to form a polyolefin reaction mixture;
   (b) transferring the polyolefin reaction mixture to a high pressure separator, wherein the pressure in the high pressure separator is within the range of from 200 to 2500 kPa; and
   (c) contacting the polyolefin reaction mixture with an organic amine prior to its entering the high pressure separator;
   wherein the organic amine is maintained at a concentration within the polyolefin reaction mixture within the range of from 10 to 2000 wppm.

15. The process of claim 14, wherein the α-olefin monomer is selected from ethylene and $C_3$ to $C_{10}$ α-olefins.

16. The process of claim 14, wherein the α-olefin monomer is propylene and optionally ethylene, 1-butene or 1-hexene, and the polyolefin is polypropylene.

17. The process of claim 14, wherein the pressure within the reactor is at least 5% greater than the pressure in the high pressure separator.

18. The process of claim 14, wherein the transferring is by means of a first transfer means, and wherein the organic amine is injected into the first transfer means.

19. The process of claim 14, wherein the polyolefin reaction mixture is maintained at a temperature above 50° C.

20. The process of claim 14, wherein the pressure in the reactor is maintained within the range of from 2 to 30 MPa.

21. The process of claim 14, wherein the organic amine is an amine having the following formula: $(R'OH)_{3-x}NR_x$, wherein R is selected from the group consisting of hydrogen atoms, $C_1$ to $C_{40}$ alkyl radicals, $C_2$ to $C_{40}$ alkylethers, $C_1$ to $C_{40}$ alkylcarboxylic acids, and $C_2$ to $C_{40}$ alkylesters; and wherein R' is selected from $C_1$ to $C_{40}$ alkyl radicals, $C_2$ to $C_{40}$ alkylethers, $C_1$ to $C_{40}$ carboxylic acids, and $C_2$ to $C_{40}$ alkylesters; and wherein x is 0, 1, 2 or 3.

22. The process of claim 21, wherein R is selected from the group consisting of hydrogen atoms and $C_5$ to $C_{40}$ alkyl radicals; and wherein R' is selected from $C_5$ to $C_{40}$ alkyl radicals and $C_5$ to $C_{40}$ alkylethers.

23. The process of claim 14, wherein the polyolefin reaction mixture is separated into unreacted carrier fluids and polyolefin, isolating the polyolefin, and recycling the unreacted carrier fluids to the reactor.

24. The process of claim 23, wherein the polyolefin is insoluble with the unreacted carrier fluids.

25. The process of claim 23, wherein the polyolefin is polypropylene.

26. The process of claim 14, wherein an amount of organic amine is injected that substantially eliminates agglomeration within the high pressure separator.

* * * * *